Nov. 3, 1959   S. L. REICHES   2,911,578
TIMER
Filed Aug. 18, 1958
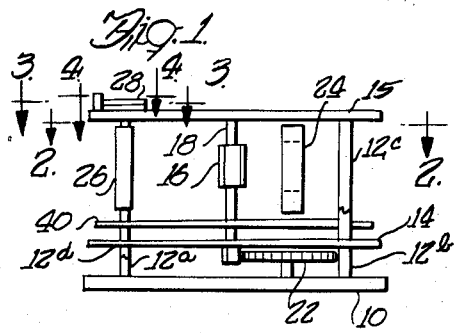
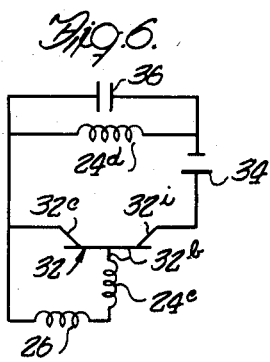
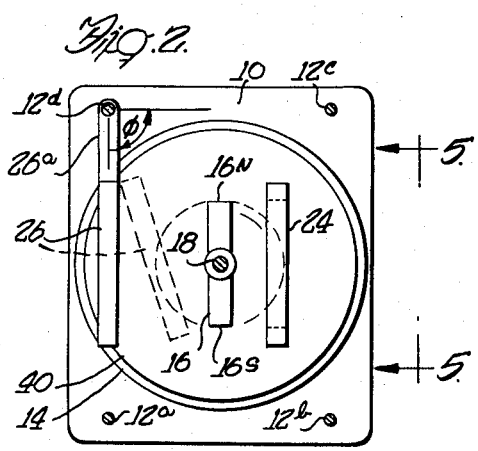
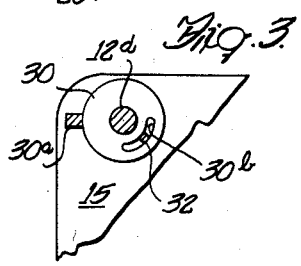
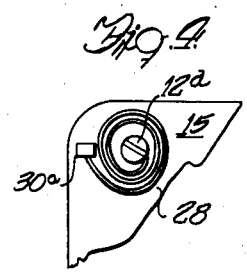
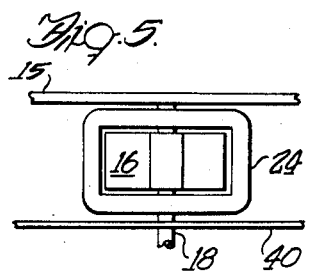
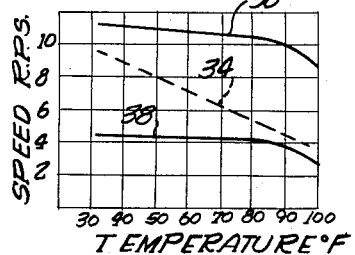
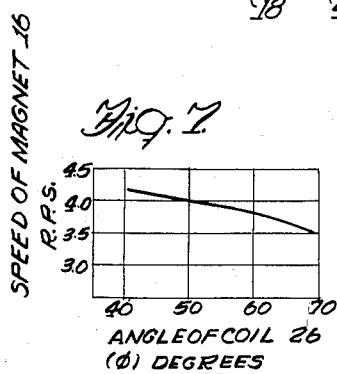
INVENTOR.
Sol L. Reiches
BY George E. Frost
Attorney United States Patent Office 2,911,578
Patented Nov. 3, 1959

2,911,578
TIMER

Sol L. Reiches, Shaker Heights, Ohio

Application August 18, 1958, Serial No. 755,674

5 Claims. (Cl. 318—254)

My invention relates to an improved electrically driven rotary timer and particularly to such a timer of the battery energized type.

Timer mechanisms of the rotary type, such as those used to drive clocks, switches, and the like, operate at predetermined rotational velocity so that the number of rotations measures the elapsed time. In one form of such timer a rotor having magnet poles is driven by a battery acting through a transistor to provide timing rotations at small battery drain and hence at low battery cost. Timers of this type possess the advantage of requiring no winding operations and no external power source. However, they are subject to inaccuracies as changes occur in the retarding torque, the battery voltage, the temperature, and other influences.

In accordance with the present invention, the influence of the various error-creating factors is reduced by so arranging the mechanism that the rotor drive is obtained through timed current pulses of duration and magnitude (and hence energy content) such as to impart precisely the desired speed of rotation. This is accomplished through the coaction of a fixed drive winding, with a fixed control winding and a movable control winding. The latter operates to vary the duration and integrated value of the drive current pulses and serves to maintain the desired speed. Since the principal factor influencing the speed of the motor is the ambient temperature, the movable winding is preferably moved automatically in response to that temperature and in amount to compensate for the effect of temperature on the rotor speed.

Preferably, the major portion of each current pulse in the drive coil is in the saturation region of the transistor characteristic, since this serves to provide a driving impulse that is less dependent upon variations in the transistor characteristics, battery voltage, and other factors that are necessarily associated with operation of the unit. However, the principle of the present invention may be applied to units in which the drive current flow is at all times below the current saturation region of the transistor.

It is therefore a general object of the present invention to provide an improved electrically operated rotary timer.

Further it is an object of the present invention to provide an improved electrically operated rotary timer characterized by small power requirements and suitable for use when battery driven.

Still another object of the present invention is to provide an improved rotary timer which inherently operates at substantially constant speed.

Still another object of the present invention is to provide a rotary timer of the above type which includes a mechanism to compensate for the effect of external influences, such as temperature.

It is still another object of the present invention to provide a transistor type battery operated timer in which a rotor is driven by periodic current pulses of energy content automatically regulated to maintain constant rotor speed.

It is still another object of the present invention to provide an improved timer of the transistor type in which a primary control winding serves to develop periodic drive current pulses and an auxiliary control winding serves to vary the energy content of each drive current pulse as necessary to provide uniform speed.

It is another object of the present invention to provide an improved battery operated transistor type rotary timer which embodies features of construction, combination, and arrangement which render it simple in construction, reliable in operation, highly accurate as a timing mechanism, and highly effective for practical use.

The novel features which I believe to be characteristic of my invention are set forth with particularity in the appended claims. My invention itself, however, together with further objects and advantages thereof, will best be understood by reference to the following description taken in conjunction with the accompanying drawings in which:

Figure 1 is a side elevational view of a timer constructed in accordance with the present invention;

Figure 2 is a cross-sectional view through axis 2—2, Figure 1;

Figures 3 and 4 are somewhat enlarged fragmentary cross-sectional views through axis 3—3 and axis 4—4, Figure 1, respectively;

Figure 5 is a fragmentary cross-sectional view through axis 5—5, Figure 2;

Figure 6 is a circuit diagram of the electrical elements used in the apparatus of Figure 1;

Figure 7 is a chart showing the variation in rotor speed as the position of the auxiliary control coil is varied; and Figure 8 shows the operation of the motor with a temperature controlled auxiliary control coil and without such a coil.

The construction of the timer is best seen in Figures 1 to 5, inclusive. It includes a main base member 10 having four upstanding support posts 12a, 12b, 12c, and 12d, Figures 1 and 2. A lower plate 14 is supported on the posts 12a, 12b, 12c, and 12d between base 10 and a top plate which is also supported by the posts. The support posts 12a, 12b, 12c and 12d may be any one of the constructions well known in the timer art. Preferably, each is attached to the base 10 and to the plates 14 and 15 by screw or other readily removed means (not shown).

The rotor magnet 16 is mounted on the shaft 18 which extends between and is journaled in the plates 14 and 15 and depends slightly below the bottom plate 14 to receive the pinion 20. The magnet 16 has a north pole at end 16N and a south pole at end 16S. During timer operation, this magnet rotates at constant speed to drive pinion 20, together with bull gear 22 to operate the driven mechanism (not shown).

The drive winding is indicated at 24. This winding is of rectangular construction and defines a window to receive the rotating magnet 16, as shown in Figures 1, 2 and 5. The winding 24 is suitably affixed to the plate 15, as by gluing or other means (not shown). As hereinafter described in detail, the winding 24 has two separate portions, one of which serves as a drive winding and the other of which serves as a control winding.

An auxiliary control winding 26 is mounted on the arm 26a which in turn is cemented or otherwise attached to the flat face of the post 12d as is shown in Figure 2. In the region between the top and bottom plates 14 and 15, respectively, the post 12d is free to rotate so that this post defines a swingable support structure for the winding 26. The position of rotation of the post 12d (and hence the position of the auxiliary control winding 26) is determined by the spiral bi-metal 28, Figure 4. At its inner end this bi-metal is received in a slot formed on the end of the post 12d which at this point protrudes above the plate 15. At its outer end, this bi-metal is affixed in the upstanding ear 30a of the control disc 30, Figure 3. It will be noted that this disc has an arcuate elongated slot 30b which receives the set screw 32 which is threadedly received in the plate 15 to anchor the disc 30 in adjusted position. It will be noted from the foregoing that the position of ear 30a and hence the outer end of the spiral bi-metal may be adjusted by loosening the screw 32 and rotating the disc 30 to the desired position. Since the position of the shaft 12d at any particular temperature is thus varied, this adjustment serves to vary the position of the auxiliary control coil 26.

The circuit of the motor is shown in Figure 6. The winding 24 consists of a drive portion 24d and a control portion 24c. The latter is connected in series with the auxiliary control winding 26 between the base 32b and the collector 32c of the transistor indicated generally at 32. The drive portion 24d of the winding 24 is connected in series with the battery 34 between the collector 32c and the injector 32i of the transistor 32. A capacitor 36 is connected across the drive portion of the winding 24 as shown.

*Practical operation*

The practical operation of the timer of Figures 1 to 6 will best be understood by considering the sequence of events as the rotor 16 turns. When the pole 16n approaches the winding 24, the flux linkage between those two elements changes. This gives rise to a voltage between the base 32b and the collector 32c of the transistor 32 (due to induction in winding 24c), that brings the voltage relation of collector 32c and base 32b into the conduction region to cause current conduction through the injector 32i, the base 32b, and the collector 32c. The result is a current flow through the winding 24d that attracts the pole 16N of magnet 16. That is, the current flow is of such direction as to cause the magnet 16 to seek an aligned position with the winding 24. This condition continues until the magnet 16 swings beyond the point of maximum linkage with the winding 24, at which time the inertia of the magnet 16 will cause the motion to continue and the flux linking the winding 24c will thereupon decrease. The decaying flux produces a voltage of opposite sense in winding 24c and (in the absence of other events) brings the current conduction in the transistor 32 to an end. There will thereafter be no current flow in the winding 24 until, through the inertia of rotor 16 and other moving parts, the magnet again swings around to the position discussed above where the next current pulse is generated.

Due to the action of the successive current pulses above described, the rotating system, including the magnet 16, serves to maintain its rotation. The energy losses of the system are supplied from the battery 34 through the successive current pulses. Under any conditions of operation the speed of rotation is the speed at which the energy derived from the current pulses is equal to the energy dissipated in friction, windage, etc. The degree of speed uniformity is limited since external influences—particularly temperature—give rise to variations in the integrated value (and energy content) of the successive pulses and hence the speed at which equilibrium of applied energy and energy dissipated takes place. The winding 26 serves to compensate for this variation.

It will be noted in Figure 6 that the winding 26 is connected in series with the winding 24c. The auxiliary control winding 26 thus serves to vary the voltage relation of the collector 32c and the base 32b. Since winding 24c is linked by flux from the rotating magnet 16, the winding 24c varies the net voltage effective in generating the current pulses. If, for example, the winding 26 is so connected that the approach of the pole 16N gives rise to a voltage in opposition to the conducting direction of the transistor 32, the effect of the winding 26 will be to cut short the current impulses in the winding 24. This is due to the fact that the voltage induced in the winding 26 will oppose and overcome the voltage induced in the winding 24c just prior to the time the voltage in winding 24c would otherwise disappear or reverse in direction. With this arrangement, the winding 26 tends to reduce the energy value of each pulse of current flow in winding 24 in accordance with the position of winding 26 and the degree of the reduction increases as winding 26 swings in counterclockwise direction as seen in Figure 2. With the winding 26 so connected, the bi-metal 28 is arranged so that with increasing temperature the post 12d rotates in the clockwise direction as seen in Figures 2, 3, and 4, and the winding 26 is brought out of the field of the magnet 16 as temperature rises. Thus the movement of the winding 26 acts in opposite sense to the effect of temperature in decreasing the energy value of each successive drive pulse and with proper choice of bi-metal characteristics, effective compensation takes place.

In the alternative, the winding 26 may be connected in additive relation to the winding 24c. When so connected, the voltage induced in the winding 26 swings the base 32b, Figure 6, in conducting relation to the collector 32c at a time to extend the time or the value of the current-pulse produced by winding 24c. Under these conditions, the effect of the winding 26 tends to increase the speed of rotation of magnet 16 as the winding 26 is brought into closer relationship with the magnet 16. With this arrangement, the bi-metal 28 is arranged to swing the auxiliary control winding 26 in the counter clockwise direction as seen in Figure 2 with increasing temperature. Thus with increasing temperature this winding becomes more effective in increasing the energy value of each successive current impulse and thus overcomes the effect of increasing temperature in reducing the energy value of each successive impulse.

Figure 7 shows how variation of the angle of coil 26 when connected cumulatively varies the rotational speed of the magnet 16. A variation of angle of a total of 30° is shown and the speed varies from about 3.5 revolutions per second to about 4.2 revolutions per second. The angle is measured in relation to the body of the timer as shown in Figure 2.

Figure 8 shows the action of the timer under variations in temperature. In curve 34, Figure 8, the auxiliary control coil 26 is shunted out and is thus not effective.

In going from 30° F. to about 100° F., the speed varied from about 10 revolutions per second to about 4 revolutions per second. When the control coil 26 was connected in aiding relation to the action of the main control coil 24, and the bi-metal 28 arranged to bring the control coil into the influence of rotor 16 as temperature increased, the curve 36 was obtained. It will be observed that with this curve, the speed variation with temperature is greatly reduced, and, in addition, the speed of magnet rotation is increased. When the auxiliary control coil 26 was connected in opposing relation to the main control coil 24c, and the bi-metal 28 arranged to withdraw the coil 26 with increasing temperature, the curve 38 was obtained. This curve similarly provides for uniform speed with temperature variations and, in addition gives a lower speed value.

The actual degree of speed constancy obtained with the apparatus above described may be somewhat increased by arranging the coils 24c and 26 to drive the transistor 32 to its saturation point when it is conducting. Under these conditions, the variations in transistor characteristics and the voltage of battery 34 have the least influence on the energy value of the respective current pulses. There is accordingly less need to provide compensation. This refinement, however, is not essential and if desired the high degree of uniformity of speed may be obtained while operating at less than the saturating current value.

The disc 40, Figures 1 and 2, is interposed between the magnet 16 and the plate 14. This disc is of magnetic material such as soft iron, and serves to avoid a time varying magnetic field in the region of gears 20 and 22 (and other parts) where such time varying flux would otherwise cause eddy current losses and inefficient operation.

In an actual timer constructed in accordance with the present invention, the transistor 32 was a type 2N107, the capacitor 36 was 1 mfd. capacity, and the battery 34 was a 1.5 volt mercury type cell. The rotor 16 was of alnico V about 1 inch long, ¼ inch wide and ⅓ inch deep. The windings 24c and 24d were wound together in a rectangular form about ¼ inch thick and defining a winding about ⅜ inch by 1 inch, winding 24c being about 2500 ohms of #44 wire; winding 24d being about 500 ohms of #42 wire. Winding 26 was about 200 ohms of #44 wire wound to about 0.06 inch thickness and defining a rectangular window about ⅜ inch by 1 inch.

While I have shown and described specific embodiments of the present invention it will, of course, be understood that I do not wish to be limited thereto and that many modifications and alternative constructions may be made without departing from the true spirit and scope of this invention. I therefore intend by the appended claims to cover all such modifications and alternative constructions which may be made without departing from the true spirit and scope of this invention.

What I claim as new and desire to secure by Letters Patent of the United States is:

1. A timer mechanism comprising in combination: a rotor having an axis of rotation and a pair of magnet poles spaced along a line substantially intersecting the axis: means supporting the rotor for rotation about the axis; a drive winding having an axis substantially aligned with the rotor magnet poles when in one position of rotation to sustain rotational movement of the rotor when subjected to periodic current pulses; a primary control winding located in fixed position within the zone of magnetic influence of the rotor to produce voltage pulses in response to rotor rotation; an auxiliary control winding; a D.-C. voltage source; circuit means including a transistor defining a path of controlled impedance from said source through the drive winding and including a control electrode for said path; means connecting the primary and auxiliary control windings to the control electrode to reduce the impedance of said path in response to rotor rotation and thereby cause timed current pulses through the drive winding; and means supporting the auxiliary control winding in movable position in relation to the rotor to vary the extent the auxiliary control winding modifies the action of the primary control winding and hence the energy content of each current pulse in the drive winding and the speed of rotor movement.

2. A timer mechanism comprising in combination: a rotor having an axis of rotation and a pair of magnet poles spaced along a line substantially intersecting the axis; means supporting the rotor for rotation about the axis; a drive winding having an axis substantially aligned with the rotor magnet poles when in one position of rotation to sustain rotational movement of the rotor when subjected to periodic current pulses; a primary control winding located in fixed position within the zone of magnetic influence of the rotor to produce voltage pulses in response to rotor rotation; an auxiliary control winding; a D.-C. voltage source; circuit means including a transistor defining a path of controlled impedance from said source through the drive winding and including a control electrode for said path; means connecting the primary and auxiliary control windings in aiding relation to the control electrode to reduce the impedance of said path in response to rotor rotation and thereby cause timed current pulses through the drive winding; means supporting the auxiliary control winding in movable position in relation to the rotor to vary the extent the auxiliary control winding modifies the action of the primary control winding and hence the energy content of each current pulse in the drive winding and the speed of rotor movement; and means to move the auxiliary control winding toward the rotor in response to increased temperature.

3. A timer mechanism comprising in combination: a rotor having an axis of rotation and a pair of magnet poles spaced along a line substantially intersecting the axis; means supporting the rotor for rotation about the axis; a drive winding having an axis substantially aligned with the rotor magnet poles when in one position of rotation to sustain rotational movement of the rotor when subjected to periodic current pulses; a primary control winding located in fixed position within the zone of magnetic influence of the rotor to produce voltage pulses in response to rotor rotation; an auxiliary control winding; a D.-C. voltage source; circuit means including a transistor defining a path of controlled impedance from said source through the drive winding and including a control electrode for said path; means connecting the primary and auxiliary control windings in opposing relation to the control electrode to reduce the impedance of said path in response to rotor rotation and thereby cause timed current pulses through the drive winding; means supporting the auxiliary control winding in movable position in relation to the rotor to vary the extent the auxiliary control winding modifies the action of the primary control winding and hence the energy content of each current pulse in the drive winding and the speed of rotor movement; and means to move the auxiliary control winding away from the rotor in response to increased temperature.

4. A timer mechanism comprising in combination: a rotor having an axis of rotation and a pair of magnet poles spaced along a line substantially intersecting the axis; means supporting the rotor for rotation about the axis; a fixed drive winding having an axis substantially aligned with the rotor magnet poles when in one position of rotation to sustain rotational movement of the rotor when subjected to periodic current pulses; a primary control winding aligned with and adjacent to the drive winding to produce voltage pulses in response to rotor rotation; an auxiliary control winding; a D.-C. voltage source; circuit means including a transistor defining a path of controlled impedance from said source through the drive winding and including a control electrode for said path; means connecting the primary and auxiliary control windings to the control electrode to reduce the impedance of said path in response to rotor rotation and thereby cause timed current pulses through the drive winding; and means swingably supporting the auxiliary control winding on the side of the rotor opposite the drive winding and in movable position towards and away from the rotor to vary the extent the auxiliary control winding modifies the action of the primary control winding and hence the energy content of each current pulse in the drive winding and the speed of rotor movement.

5. A timer mechanism comprising in combination: a rotor having an axis of rotation and a pair of magnet poles spaced along a line substantially intersecting the axis; means supporting the rotor for rotation about the axis; a fixed drive winding having an axis substantially aligned with the rotor magnet poles when in one position of rotation to sustain rotational movement of the rotor when subjected to periodic current pulses; a primary control winding aligned with and adjacent to the drive winding to produce voltage pulses in response to rotor rotation; an auxiliary control winding; a D.-C. voltage source; circuit means including a transistor defining a path of controlled impedance from said source through the drive winding and including a control electrode for said path; means connecting the primary and auxiliary control windings to the control electrode to reduce the impedance of said path in response to rotor rotation and thereby cause timed current pulses through the drive winding; and means swingably supporting the auxiliary control winding on the side of the rotor opposite the drive winding and in movable position in relation to the rotor to vary the extent the auxiliary control winding modifies the action of the primary control winding and hence the energy content of each current pulse in the drive winding and the speed of rotor movement, said means moving the auxiliary control winding response to temperature and in sense to compensate for the variation in energy content of the current pulses with temperature.

No references cited.